Nov. 15, 1966  P. LARUE  3,285,012
SOLID PROPELLANT ROCKET MOTORS
Filed March 4, 1964  2 Sheets-Sheet 1

Nov. 15, 1966  P. LARUE  3,285,012
SOLID PROPELLANT ROCKET MOTORS
Filed March 4, 1964  2 Sheets-Sheet 2

United States Patent Office 3,285,012
Patented Nov. 15, 1966

3,285,012
SOLID PROPELLANT ROCKET MOTORS
Pierre Larue, Chatenay-Malabry, France, assignor to Office National d'Etudes et de Recherches Aerospatiales (O.N.E.R.A.), Seine, France, a society of France
Filed Mar. 4, 1964, Ser. No. 349,502
Claims priority, application France, Mar. 5, 1963, 926,906
18 Claims. (Cl. 60—253)

The present invention relates to solid propellant rocket motors and it is more especially but not exclusively concerned with rocket motors to be used either as main power plants or as auxiliary power plants (for stabilizing, guiding, pressure feeding, power generating, torque generating and other purposes) in air or space vehicles.

The chief object of the present invention is to provide a rocket motor which is well adapted to meet the requirements of practice, in particular concerning the combustion of the propelling charge and the variation of its thrust according to a given law.

In such rocket motors, the solid propellant is in the form of a solid block having at one of its ends a free surface from which can be started and propagated toward the other end a front combustion sometimes called cigarette butt combustion), this block being in the form of at least one semi-spherical element comprising two portions made of powders of different respective velocities of combustion (hereinafter called "fast burning powder" and "slow burning powder," respectively) the fast burning powder portion being in the form of a spherical sector of the semi-spherical element coaxial therewith and the slow burning powder portion occupying substantially the remainder of the volume of said semi-spherical element. According to the present invention, the two powder portions being in intimate contact with each other, the apex angle 2A of the fast burning powder spherical sector and the ratio $k$ of the velocity of combustion of the fast burning powder to the velocity of combustion of the slow burning powder are linked together by the relation $k=1/\cos A$. Furthermore, if it is desired to obtain neutrality of the rocket motor (constant thrust) during the combustion of the semi-spherical element made as above stated, cos A should be not very different from $2/3$, whereby $k$ is closed to 1.5.

Preferred embodiments of the present invention will be hereinafter described with reference to the appended drawings, given merely by way of example, and in which.

Figure 1:
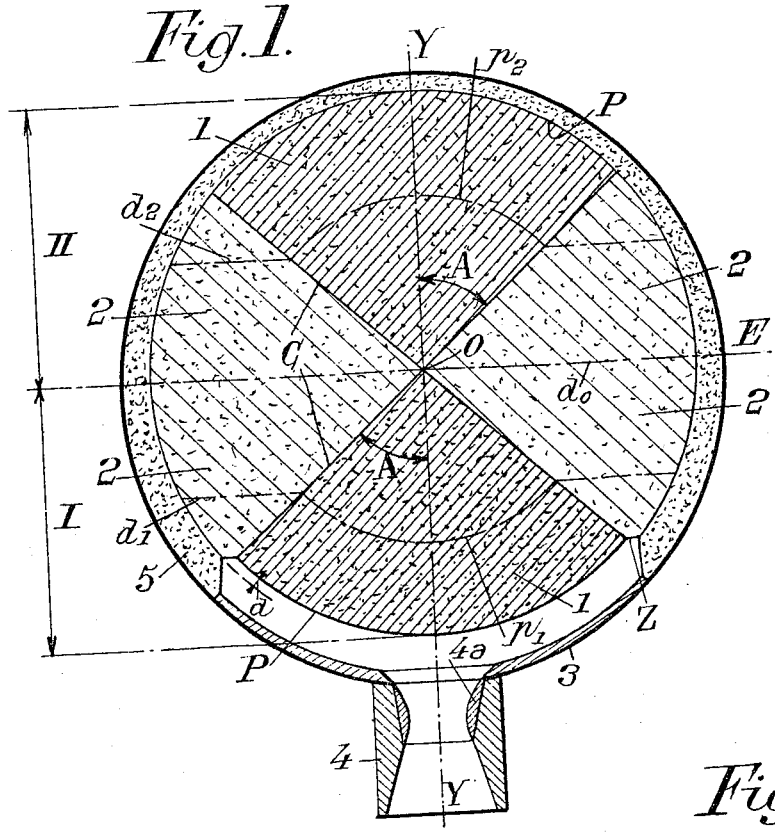
FIG. 1 is an axial sectional view of a solid propellant rocket motor made according to a first embodiment of the invention.

The solid propellant of the rocket motor according to the present invention is in the form of a solid block of revolution having at one of its ends a free surface from which front combustion can start and be pursued in the general direction of the axis of revolution YY of the propellant block, toward the other end of said block.

According to the present invention the propellant block comprises at least one semi-spherical element having its axis along the direction of thrust and consisting of two portions 1 and 2 in intimate contact with each other. These portions are made of a fast burning powder and a slow burning powder respectively. The ratio of the rate of combustion of the fast burning powder to the rate of combustion of the slow burning powder is equal to $k$.

The fast burning powder 1 occupies the volume of a spherical sector coaxial with the semi-spherical element and the surface of which comprises on the one hand a cone C having its axis along YY and its apex at the center O of the semi-spherical element and on the other hand the spherical cap P corresponding to said cone C. The slow burning powder portion 2 occupies the remainder of the volume of the semi-spherical element, this remainder being limited by the equatorial plane E of said element, by cone C and by a spherical zone which is to be inhibited.

Ratio $k$ and the apex angle 2A of cone C are linked together by relation $k=1/\cos A$, at least approximately.

Thus, both in the case where front combustion starts from the spherical cap of the semi-spherical element and in that where this combustion starts from the equatorial face of the element there is simultaneously obtained a combustion of portions 1 and 2, which means that the combustion of the block will not leave any sliver.

On the other hand, if it is desired, as it is generally the case, to obtain an at least approximate neutrality of the propellant block, that is to say a substantially constant thrust during the whole time of combustion of said block, angle A must be chosen of a value Ao such that cos Ao is as close as possible to $2/3$, so that factor $k$ has a value as close as possible to 1.5.

The composite semi-spherical element above described may be used separately, with its equatorial face directed either toward the front or toward the rear. Advantageously, as shown by the drawing, this block is used in combination with one or several powder elements and in this case the semi-spherical element is preferably used either as initial portion (from which front combustion is started) and/or as end portion (where the front combustion is completed) of the block.

Of course in this last case, that is to say when the semi-spherical element acts either as initial portion or end portion of the fuel block, its convexity will be turned toward the outside, said element being joined to the next element of the block through its equatorial face.

In the embodiment illustrated by FIG. 1 the propellant block consists of the combination with each other of two semi-spherical elements 1 and 2 made as above mentioned and adjoining each other along their equatorial plane E (perpendicular to the thrust axis YY of the rocket motor).

This spherical propellant block is housed in a spherical casing 3, for instance of metal or a stratified material, provided with a nozzle 4 surrounding axis YY and preferably made, in particular concerning its throat 4a, of a material having a low rate of erosion. This construction permits, if necessary, of obtaining long times of combustion and in this case use can be made of graphite, tungsten, some metal carbides and so on.

It should be noted that a small recess of constant depth may be provided over the whole area of the quick burning powder spherical cap P so that the ignition surface, along which front combustion is started, consists not only of said cap P, made exclusively of fast burning powder but also of an annular area Z running along the edge of said cap P and provided on the slow burning powder portion where front combustion is thus started at the same time as in the fast burning powder.

In order to obtain a correct behaviour of the motor, it is advantageous to provide the surface of contact of the spherical propellant block with casing 3, also of spherical shape, with an inhibitor lining 5. Advantageously the thickness of this lining is greater at the rear than at the front, so that casing 3 is slightly eccentric with respect to the spherical fuel block.

Figure 1A:
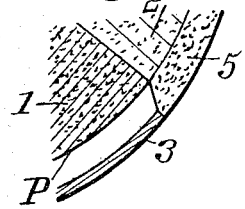
FIG. 1a shows a modification of a detail of FIG. 1.

It should be noted that this eccentricity of casing 3 permits of reducing the depth $d$ of the recess where ignition takes place and even to eliminate such a recess, in which case the inhibitor lining 5 should extend as far as the edge of the fast burning powder spherical cap, as shown by FIG. 1a.

FIG. 1 shows in dot-and-dash lines successive positions of the surface of combustion at a given instant.

This surface, comprises, in semi-spherical element I, a spherical cap $p_1$ in the fast burning powder portion 1 and an approximately flat annular disc $d_1$ in the slow burning powder portion 2.

Between elements I and II the combustion surface is approximately a plane.

In the semi-spherical end element II, the combustion surface comprises a spherical cap $p_2$ in the fast burning powder portion and an approximately flat annular disc $d_2$ in the slow burning powder.

All that has been said above is true whatever be the value of angle A, provided of course that the relation $k=1/\cos A$ is complied with.

In the particular case where angle A is given a value $Ao$ such that $\cos Ao$ is $2/3$ and therefore $k=1.5$, neutrality of the thrust is further obtained. This neutrality has been shown to exist within a margin of $+1.7\%$ to $-2\%$, due in particular to the marginal alteration of the emission surface in the vicinity of casing 3.

It should be noted that it is possible, if necessary, to dispense, at least for a part of a combustion, with the character of neutrality and to choose angle A, in one and/or the other of the semi-spherical blocks, in such manner as to obtain a thrust varying according to a given law. If the angle A is smaller than the critical value $Ao$ the thrust variation law is increasing when the combustion moves from one pole toward the equator and decreasing in the other case. Of course the choice of an angle A greater than the initial value $Ao$ gives a thrust law varying inversely of the preceding one.

It should also be noted that when the fuel block comprises two spherical elements having their respective equatorical planes turned toward each other, it is possible to use, for the respective angles A of these two elements, different values, which requires different values for the respective coefficients $k$ of said elements, and consequently combinations of powders, for these two elements, having combustion velocities in the desired ratios.

There is thus obtained a block made of at least three different powders and which permits of obtaining, within a great range, great variations of the shape of the thrust curve.

Figure 2:
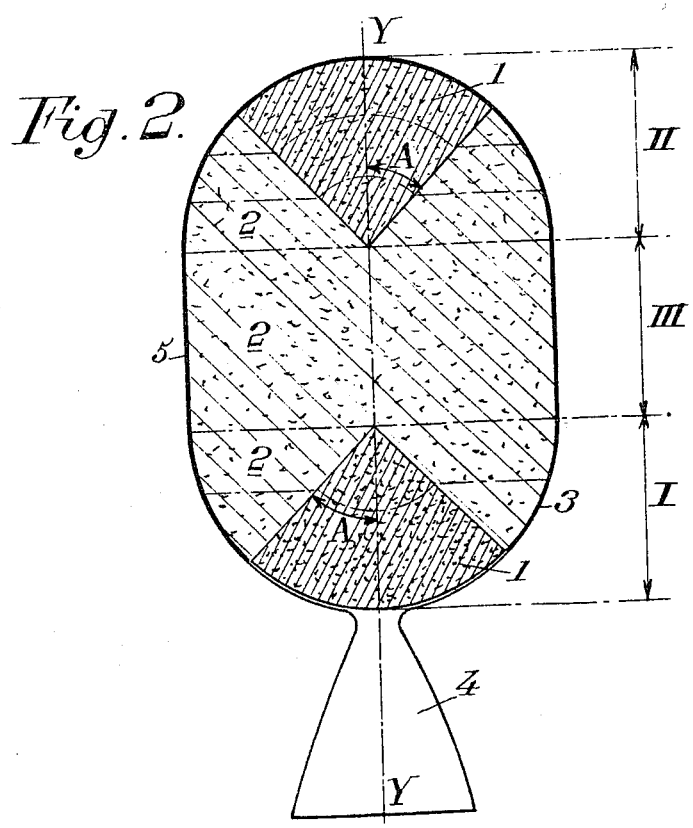
FIG. 2 shows, similarly to FIG. 1 but in a more diagrammatic manner, another embodiment of the rocket motor according to the invention.

If it is desired, for a given total weight of powder, corresponding to a given result, to obtain the best possible value for the construction index of the rocket motor (ratio of the weight of the rocket motor without its solid propellant to the weight of said motor provided with its propellant) it is possible to have recourse to the embodiment of FIG. 2 according to which semi-spherical elements 1 and 2, instead of being joined to each other along their equatorial surfaces, are connected to a cylindrical intermediate element which is advantageously made of slow burning powder and is integral with the slow burning powder portions of said semi-spherical elements. Anyway, the rocket motors above described have, with respect to conventional front combustion systems, many advantages among which may be cited in particular, their high coefficient of filling and their low construction index.

Figure 3:
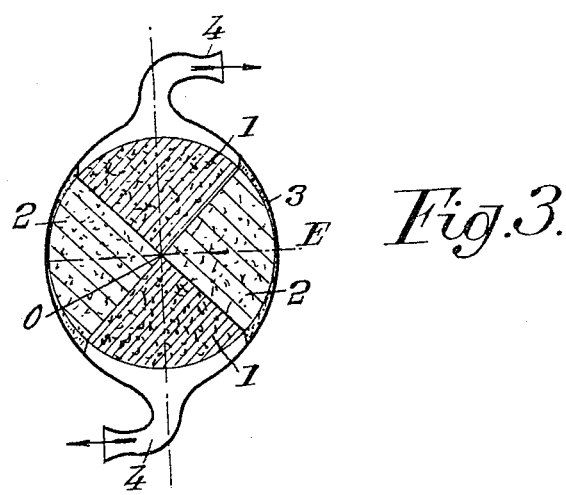
FIG. 3 is a diagrammatic view of another embodiment of the invention.

When it is desired to obtain an auxiliary rocket motor for producing a torque it is possible to proceed as follows:

As shown by FIG. 3, two identical semi-spherical elements similar to element 1 in FIG. 1 and adjoining each other along their equatorial plane are fitted in a casing 3 provided with two inversely bent nozzles 4 directed tangentially at 180° to each other so as to create the desired torque.

In a general manner, while the above description discloses what are deemed to be practical and efficient embodiments of the present invention, said invention is not limited thereto as there might be changes made in the arrangement, disposition and form of the parts without departing from the principle of the invention as comprehended within the scope of the appended claims.

What I claim is:

1. A rocket motor which comprises, in combination, a shell of semi-spherical shape having an axis of symmetry, nozzle means carried by said shell and starting from a point located on said axis, and a semi-spherical mass of solid propellant fitting, at least approximately, in said shell, said solid propellant mass consisting of two different portions both of revolution about said axis, one of said portions, made of a propellant burning faster than that of the other portion, being in the form of a spherical sector of revolution about said axis, the other portion occupying the remainder of the semi-spherical volume of said mass, said two propellant portions being in intimate contact with each other, the apex angle 2A of said fast burning propellant portion and the ratio $k$ of the velocity of combustion of the fast burning propellant to the velocity of combustion of the other propellant being linked together by the relation $k=1/\cos A$, the end of said solid propellant mass on the side of which said nozzle means is located having an ignition free surface symmetrical about said axis.

2. A rocket motor according to claim 1 wherein $\cos A$ is approximately equal to $2/3$, whereby coefficient $k$ is approximately equal to 1.5.

3. A rocket motor according to claim 1 wherein the radius of the spherical surface of said sector is slightly smaller than the radius of the remainder of said propellant mass.

4. A rocket motor which comprises, in combination, a rearwardly convex shell of semi-spherical shape having an axis of symmetry, radial nozzle means carried by said shell and starting rearwardly from a rear point thereof located on said axis, a semi-spherical mass of solid propellant fitting approximately in said shell, said solid propellant mass consisting of two different portions both of revolution about said axis, one of said portions, made of a propellant burning faster than that of the other portion, being in the form of a spherical sector of revolution about said axis, the other portion occupying the remainder of the semi-spherical volume of said mass, said two propellant portions being in intimate contact with each other, the apex angle 2A of said fast burning propellant portion and the ratio $k$ of the velocity of combustion of the fast burning propellant to the velocity of combustion of the other propellant being linked together by the relation $k=1/\cos A$, and a layer of inhibitor substance filling the space between the inner semi-spherical surface of said shell and the outer semi-spherical surface of said propellant mass with the exception of the space opposite an ignition free surface symmetrical about said axis.

5. A rocket motor according to claim 4 wherein said ignition free surface is the spherical surface of said spherical sector.

6. A rocket motor according to claim 4 wherein said ignition free surface comprises the spherical surface of said spherical sector and a circular zone of said other propellant portion outer spherical surface adjoining the circular edge of said spherical sector.

7. A rocket motor according to claim 4 wherein the radius of the spherical surface of said sector is slightly smaller than the radius of the remainder of said propellant mass.

8. A rocket motor according to claim 4 wherein the center of said propellant mass is slightly ahead of the center of said shell.

9. A rocket motor which comprises, in combination, a shell including a frontwardly convex semi-spherical portion having an axis of symmetry, radial nozzle means carried by said shell and starting rearwardly from a rear point thereof located on said axis, a semi-spherical mass of solid propellant fitting approximately in said shell semi-spherical portion, said solid propellant mass consisting of two different portions both of revolution about said axis, one of said propellant portions, made of a propellant burning faster than that of the other portion, being in the form of a spherical sector of revolution about said axis, the other portion occupying the remainder of the semi-spherical volume of said mass, said two propellant portions being in intimate contact with each other, the apex angle 2A of said fast burning propellant portion and the ratio $k$ of the velocity of combustion of the fast burning propellant to the velocity of the other propellant being linked together by the relation $k=1/\cos A$, ignition of said propellant mass starting from the rear equatorial face thereof and a layer of inhibitor substance between the outer surface of said propellant mass and the inner surface of said shell portion over the whole area of said surface.

10. A rocket motor according to claim 9 wherein the center of said propellant mass is slightly ahead of the center of said shell semi-spherical portion.

11. A solid propellant rocket motor which comprises, in combination, a shell of spherical shape, a rearward nozzle carried by said shell and extending radially therefrom and a spherical mass of solid propellant fitting, at least approximately, in said shell, said solid propellant mass consisting of three different portions, all three of revolution about the axis of said nozzle, two of said portions, which are each made of a propellant burning faster than that of the third propellant portion, being in the form of opposed spherical sectors having their respective apexes located both at the center of said spherical mass, the third portion occupying the remainder of the spherical volume of said mass, said two opposed spherical sector propellant portions being in intimate contact with said third propellant portion, the apex angle 2A of each of said two opposed spherical sector propellant portions and the ratio $k$ of the velocity of combustion of the propellant of each of said two opposed spherical sector propellant portions to the velocity of combustion of the propellant of the third portion being respectively linked together by the relation $k=1/\cos A$, the end of said solid propellant mass forming the rear surface of the rear spherical sector having an ignition free surface located opposite said nozzle and symmetrical about said axis.

12. A rocket motor which comprises, in combination, a shell including a front part of cylindrical shape and a rear part of semi-spherical shape with its convexity turned toward the rear, both parts having a common axis of symmetry and both being of the same radius, an axial rearwardly directed nozzle carried by said shell at the rear of said rear semi-spherical part thereof and a mass of solid propellant fitting, at least approximately, in said shell, said solid propellant mass comprising two different portions both of revolution about said axis, one of said portions, made of a propellant burning faster than that of the other portion, being in the form of a spherical sector of revolution about said axis and having its apex substantially at the center of said semi-spherical part, the other portion occupying the remainder of the volume of said shell corresponding to said two parts thereof, said two propellant portions being in intimate contact with each other, the apex angle 2A of said fast burning propellant portion and the ratio $k$ of the velocity of combustion of the fast burning propellant to the velocity of the other propellant being linked together by the relation $k=1/\cos A$, the rear surface of said spherical sector having an ignition free surface located opposite said nozzle.

13. A solid propellant rocket motor according to claim 12 wherein the respective velocities of combustion of the two opposed spherical sector propellant portions are equal to each other.

14. A rocket motor which comprises, in combination, a shell including a rear part of cylindrical shape and a front part of semi-spherical shape with its convexity turned toward the front, both parts having a common axis of symmetry and both being of the same radius, an axial rearwardly directed nozzle carried by said shell at the rearwardly directed nozzle carried by said shell at the rear of said rear cylindrical part thereof and a mass of solid propellant fitting, at least approximately, in said shell, said solid propellant mass comprising two different portions of revolution about said axis, one of said portions, made of a propellant burning faster than that of the other portion, being in the form of a spherical sector of revolution about said axis and having its apex substantially at the center of said semi-spherical part, the other portion occupying the remainder of the volume of said shell corresponding to said two parts thereof, said two propellant portions being in intimate contact with each other, the apex angle 2A of said fast burning propellant portion and the ratio $k$ of the velocity of combustion of the fast burning propellant to the velocity of the other propellant being linked together by the relation $k=1/\cos A$, the rear surface of said cylindrical portion having an ignition surface located opposite said nozzle.

15. A rocket motor which comprises, in combination, a shell including an intermediate part of cylindrical shape, a rear part of semi-spherical shape with its convexity turned toward the rear and a front part of semi-spherical shape with its convexity turned toward the front, said three parts having a common axis of symmetry and being of the same radius, and axial rearwardly directed nozzle carried by said shell at the rear of said rear semi-spherical part thereof and a mass of solid propellant fitting, at least approximately, in said shell, said solid propellant mass comprising three different portions, all three of revolutions about said axis, two of said portions, each made of a propellant burning faster than that of the third portion, being in the form of a spherical sector of revolution about said axis and having its apex approximately at the center of the corresponding semi-spherical part, the third propellant portion occupying the remainder of the volume of said shell, said two spherical sector propellant portions being in intimate contact with said third propellant portion, the apex angle 2A of each of said two spherical sector propellant portions and the ratio $k$ of the velocity of combustion of the propellant of each of said two spherical sector propellant portions to the velocity of combustion of the propellant of the third portion being respectively linked together by the relation $k=1/\cos A$, the rear surface of the rear spherical sector having an ignition free surface located opposite said nozzle and symmetrical about said axis.

16. A solid propellant rocket motor according to claim 15 wherein the respective velocities of combustion of the two spherical sector propellant portions are equal to each other.

17. A solid propellant rocket motor which comprises, in combination, a shell of substantially spherical shape, two nozzles carried by said shell at the respective ends of a diameter thereof and extending perpendicularly to said diameter in opposite directions respectively, and a spherical mass of solid propellant fitting, at least approximately in said shell, said solid propellant mass consisting of three different portions, all three of revolution about said diameter, two of said portions, which are each made of a propellant burning faster than that of the third propellant portion, being in the form of opposed spherical sectors having their respective apexes located both at the center of said spherical mass, the third portion occupying the remainder of the spherical volume of said mass, said two opposed spherical sector propellant portions being in intimate contact with said third propellant portion the apex angle 2A of each of said two spherical sector propellant portions and the ratio $k$ of the velocity of combustion of the propellant of each of said two opposed spherical sector propellant portions to the velocity of combustion of the propellant of the third portion being respectively linked together by the relation $k=1/\cos A$, each end of said solid propellant mass forming the spherical surface of each of said spherical sectors having an ignition free surface located opposite the corresponding nozzle and symmetrical about said diameter.

18. A solid propellant rocket motor according to claim 17 wherein the respective velocities of combustion of the two spherical sector propellant portions are equal to each other.

References Cited by the Examiner

UNITED STATES PATENTS

| | | | |
|---|---|---|---|
| 3,001,363 | 9/1961 | Thibodaux et al. | 60—35.6 |
| 3,002,459 | 10/1961 | Harper | 102—98 |
| 3,014,427 | 12/1961 | Scurlock | 102—98 |
| 3,052,092 | 9/1962 | Kirkbride | 60—35.6 |
| 3,120,737 | 2/1964 | Holloway | 60—35.6 |
| 3,121,309 | 2/1964 | O'Donnell | 60—35.6 |

CARLTON R. CROYLE, *Primary Examiner.*

MARK NEWMAN, *Examiner.*